United States Patent
Schiller

(10) Patent No.: US 10,628,793 B2
(45) Date of Patent: Apr. 21, 2020

(54) WEIGHT SENSING CLOSED LOOP SYSTEM

(71) Applicant: Jay Schiller, Medina, WA (US)

(72) Inventor: Jay Schiller, Medina, WA (US)

(73) Assignee: Jay Schiller, Medina, WA (US)

(*) Notice: Subject to any disclaimer, the term of this patent is extended or adjusted under 35 U.S.C. 154(b) by 94 days.

(21) Appl. No.: 15/973,083

(22) Filed: May 7, 2018

(65) Prior Publication Data

US 2018/0322449 A1 Nov. 8, 2018

Related U.S. Application Data

(60) Provisional application No. 62/502,708, filed on May 7, 2017, provisional application No. 62/550,742, filed on Aug. 28, 2017, provisional application No. 62/556,449, filed on Sep. 10, 2017.

(51) Int. Cl.
  *G06Q 10/08* (2012.01)
  *G06Q 30/06* (2012.01)
  *H04W 4/38* (2018.01)
  *H04W 4/02* (2018.01)
  *H04W 4/80* (2018.01)
  *H04L 29/08* (2006.01)

(52) U.S. Cl.
  CPC ....... *G06Q 10/087* (2013.01); *G06Q 30/0633* (2013.01); *H04W 4/027* (2013.01); *H04W 4/38* (2018.02); *H04L 67/12* (2013.01); *H04W 4/80* (2018.02)

(58) Field of Classification Search
  None
  See application file for complete search history.

(56) References Cited

U.S. PATENT DOCUMENTS

| | | | | |
|---|---|---|---|---|
| 6,418,416 B1* | 7/2002 | Rosenberg | ........... | G06Q 10/087 705/22 |
| 7,650,298 B2* | 1/2010 | Godlewski | ........... | G06Q 10/087 705/28 |
| 2011/0259960 A1* | 10/2011 | Baarman | ................. | G01F 23/20 235/385 |
| 2014/0262918 A1* | 9/2014 | Chu | ......................... | A61J 1/03 206/534 |
| 2015/0285775 A1* | 10/2015 | Gurumohan | ........... | G01N 33/02 702/187 |

* cited by examiner

*Primary Examiner* — Paul Danneman

(74) *Attorney, Agent, or Firm* — Rowan Tels LLC

(57) ABSTRACT

A product container includes sensors and logic that detects a product's weight and communicates the weight to a user's device. An indication may be provided that the product weight has fallen below a set threshold value for reordering, and the user may be prompted to reorder the product. The user may electronically reorder the product or a similar product from their device using one or more software applications.

8 Claims, 7 Drawing Sheets

WEIGHT SENSING CLOSED LOOP SYSTEM

CROSS-REFERENCE TO RELATED APPLICATIONS

This application claims priority and benefit under 35 U.S.C. 119(e) to the following applications, each of which is incorporated herein by reference in its entirety:

U.S. Application Ser. No. U.S. 62/502,708 filed on May 7, 2017;

U.S. Application Ser. No. U.S. 62/550,742 filed on Aug. 28, 2017; and

U.S. Application Ser. No. U.S. 62/556,449 filed on Sep. 10, 2017.

BACKGROUND

Modern consumer computing devices such as mobile phones include Bluetooth and BLE (Bluetooth Low Energy) built in. Near field wireless communication is proliferating in homes and businesses along with IoT (Internet of Things) devices, with the mobile phone being the main consumer endpoint along with smart speakers such as Amazon® Alexa®. Beacon protocols layered on top on BLE signals allow multiple IoT devices in a home or office to communicate with a mobile or other consumer application. This new technology opens the door to closed loop systems that improve the convenience of maintaining resources in the home or office.

BRIEF SUMMARY

A system is disclosed that senses, measures and wirelessly transmits one or more readings representing a product's weight (which herein includes representative values such as mass or gravitational force) to one or more users' mobile devices (for example, iPhone) or other computer systems. The measured weight of a product (for example, milk, dog food, propane, etc.) may be displayed on the mobile device numerically or graphically in units such as, for example, pounds and/or kilograms, and/or may be a percentage and/or graphical representation of the products remaining weight with respect to its original full weight (which may be when purchased). Alternatively or additionally, an indication may be provided that the product weight has fallen below a set threshold value for reordering. One or more applications operating on the mobile devices and/or a server system compares the measured weight with the original full weight in order to calculate the portion or percent consumed and/or alert relative fullness or emptiness. The user may electronically repurchase the product from their device using one or more software applications.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
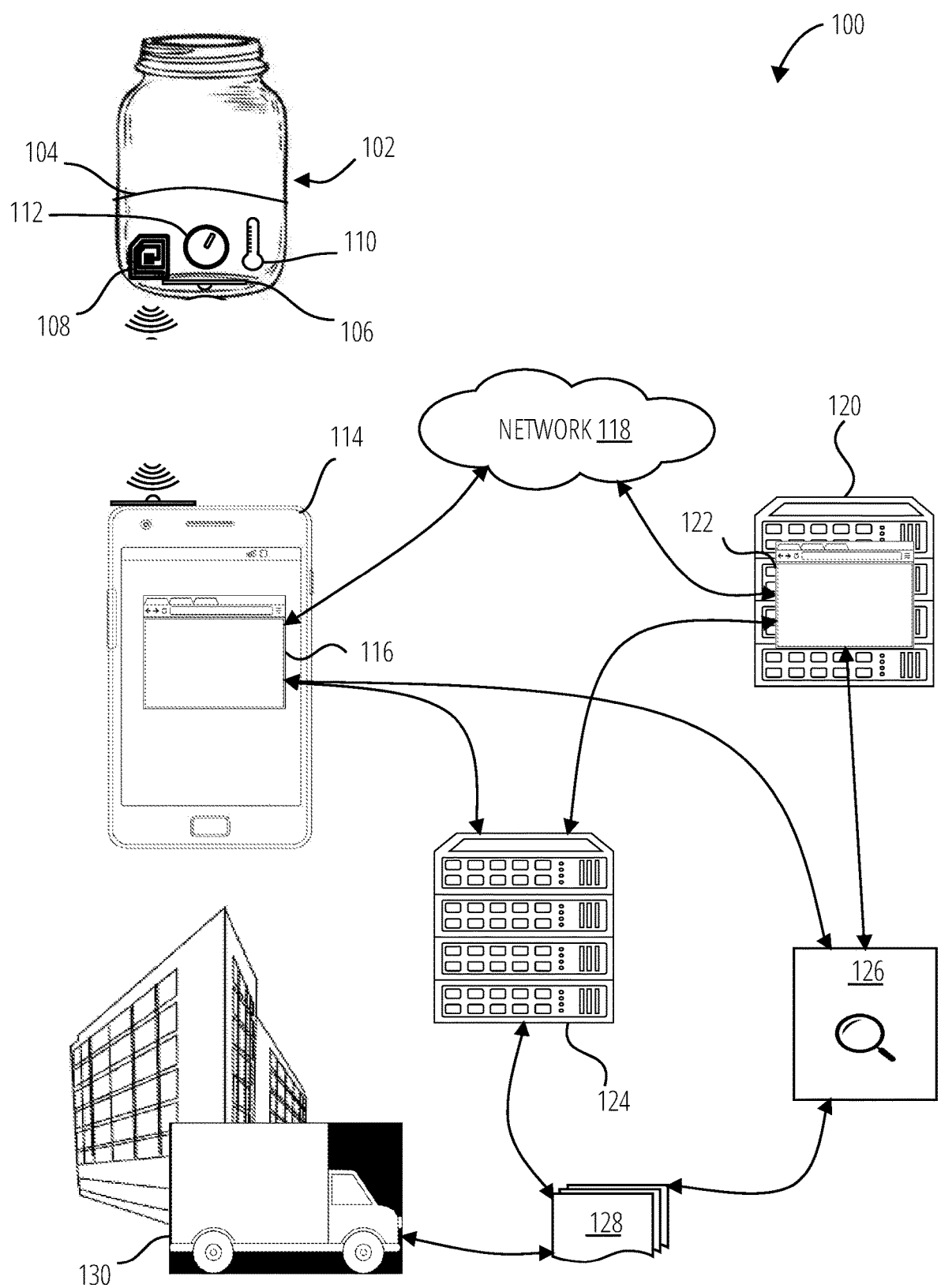
FIG. 1 illustrates a system 100 in accordance with one embodiment.

A system is described in which one or more weight sensor components, which may be piezo resistive strain gauge sensors, are electrically connected to one or more electronic circuit modules for the purpose of remotely measuring a product's weight and/or proportion remaining from a product's full original weight so that a consumer may know to repurchase or refill the product before it's empty, for instance. For example, if a bag of dog food weighs ten pounds when purchased and half is consumed then the proportion remaining from the full original weight is 50%, or half.

The weight sensor components and electronic circuit modules are, at least one of, integrated into, embedded in, placed inside, and attached to a product's packaging. A product may be packaged in bag, box, carton, jar, etc. as commonly found at a store. In another implementation, the weight sensor components and electronic circuit modules are, at least one of, integrated into, embedded in, placed inside, and attached to a separate container within which a product is placed. A product without packaging may be placed inside a separate container, such as, for example, milk in a carafe. In another use, the product in its packaging may be placed in the separate container, such as, for examples, a carton of milk in a milk box or a tray placed under a carton of milk in a refrigerator.

There may be just one weight sensor component with each product packaging or each container, for example, which may be on the bottom so that when the product is resting with its bottom on a surface the sensor can detect the weight or force between the product and the surface. There may be two weight sensor components with each product packaging or each container, for example, with one on top and one the bottom so that the weight or force can be sensed when so that when the product is resting with its bottom or its top (e.g. upside down) on a surface the sensor can detect the weight or force between the product and the surface. There may be six weight sensor components with each product packaging or each container, for example, with one on top and one the bottom and one on each of the sides so that when the product is resting with its bottom, top, or any of its sides on a surface the sensor can detect the weight or force between the product and the surface.

As understood by those skilled in the art, each of the one or more weight sensor components' electrical resistances varies by an amount that correlates with an amount of external weight, force, pressure, and/or tension applied to each. The one or more electronic circuit modules may convert each of the weight sensor component's resistances to analog voltages and each analog voltage to one or more digital voltage data values. There may be one digital voltage data value output for each weight sensor component and/or there may be one digital voltage data value output for a plurality of weight sensor components corresponding with their collective resistances and analog voltages. In order to convert resistances to analog voltages and to convert analog voltages to one or more digital voltage data values, the one or more electronic circuit modules may each include one or more Wheatstone bridges, operational amplifiers, resistors, capacitors, low pass filters, analog to digital converters, microcontrollers, memory, power supplies, batteries, and/or other electronic components as known and arranged by those skilled in the art.

Herein the digital voltage data values are also referred to as digital weight data values or just weight readings. The one or more electronic circuit modules may store the digital weight data values in memory. This system may further include one or more environment sensors that may be electrically connected to the one or more electronic circuit modules. The one or more environment sensors may be at least one of gyros, accelerometers, GPS, temperature sensors, altimeters, magnetometers, proximity sensors, optical, battery level sensors, and/or other types of sensors. The electronic circuit modules convert each of the environment sensors measures to digital 'environment data' values by using electronic components arranged in one or more circuits as known by those skilled in the art. The one or more environment sensors may be at least one of integrated in the electronic circuit module, and integrated into, embedded in, placed inside, and attached to a product's packaging. In another implementation, the one or more environment sensors may be at least one of integrated in the electronic circuit module, and integrated into, embedded in, placed inside, and attached to a container within which a product is placed. The one or more electronic circuit modules may store one or more environment data values from one or more environment sensors in memory.

The one or more electronic circuit modules may include wireless data communications technology by using electronic components arranged in one or more circuits as known by those skilled in the art. The data communication technology may be wireless Bluetooth Low Energy (BLE) RF technology and beacon protocols (which may be for example Apple iBeacon), for transmitting and receiving data. The weight sensor (or associated logic) for example may be a Bluetooth SMART device, and the user device that communicates with the weight sensor (or associated logic) would be Bluetooth SMART READY. Another wireless technology that may be utilized between the product container and the user's device is ANT+.

Using data communications, the one or more electronic circuit modules may transmit at least one of digital weight data values, environment data values, and other data stored in the electronic circuit module's memory. The other data may include at least one of identity data and product data.

At least one of digital weight data values, environment data values, and other data may be received remotely via data communications by one or more software applications on at least one of one or more mobile devices (which may for example be and Apple iPhone smartphone), one or more human operated computer systems, and one or more artificial intelligence (AI) computer systems. The computer systems may be cloud computer systems as known by those skilled in the art. The mobile devices, and human and AI computer systems may communicate vis data communications with the electronic circuit modules over at least one of the Internet, wireless which may be BLE or WIFI, and other means and a combination of means.

The software applications may use one or more software algorithms to calculate one or more products' weights from the digital weight data value and/or one or more products' proportion remaining from the full original weight by comparing the original weight with the calculated weight from the digital weight data value. For example, if a bag of dog food weighs ten pounds when purchased and half is consumed then the proportion remaining from the full original weight is 50% or half. The one or more software applications may receive one or more digital weight data values it receives for the one or more weight sensor components for each product.

Each weight sensor component may be uniquely identified in the algorithm by a unique ID from identity data and associated with a product by its product data sent from at least one of one or more electronic circuit modules and one or more Internet databases. The product data may include the full original weight of the product. The one or more software algorithms may use one or more digital weight data values to calculate the current weights of one or more products. The one or more software algorithms may use one or more digital weight data values to calculate the proportion remaining of one or more products by comparing the current weights with each product's full original weight. The algorithm be in in an application on a mobile device and/or may be on a cloud-based computer and/or AI system communicating with the application on the mobile device over the Internet.

Referring to FIG. 1, a system 100 comprises a product container 102 that contains a product 104. The product container 102 comprises a weight sensor 106 and logic 108 interfaced to accept readings from the weight sensor 106. The product container 102 may also comprise other sensors, such as a temperature sensor 110 and an accelerometer 112 and/or gyro.

An example weight sensor 106 is a Tekscan FlexiForce A401 integrated into, embedded within or attached to a product's packaging. This type of sensor element changes one or more of its electrical properties such as, for example, resistance or voltage (if powered) when it undergoes a force, pressure, stress, and/or strain due to the product's weight. The sensor element's electrical property state corresponds with the product's weight when it is placed between the product and the ground, shelf or another surface. The sensor element may be a load cell, load bar, piezoelectric, piezoresistive, pressure transducer, strain gauge, force gauge, fiber optic, or other types.

In addition to the sensor element itself, the weight sensor 106 may include logic that converts the sensor's raw electrical output, corresponding to a product's weight, to a digital "weight data" value. This logic may be part of the weight sensor 106 and/or included in the logic 108. The weight sensor 106 may use an analog to digital converter (ADC) to convert an analog electrical property to a digital weight data value. For example, the weight sensor 106 may include a Texas Instruments ADS7868IDBVR ADC integrated circuit chip. For example, a piezoresistive sensor element's electrical resistance value changes as a function of a product's weight when placed between the product and a surface, similar to, for example, a weight scale. The piezoresistive sensor element, in this example, may be attached to a Wheatsone bridge and a power supply in the sensor logic which together convert the sensor element resistance to an analog voltage level which corresponds with the product's weight. The ADC converts the analog voltage to a digital weight data value that may be, for example, 8-bit or 10-bit binary numbers.

The weight sensor 106 may include one or more instrumentation amplifiers, low pass filters, and other electronic componentry before the ADC to condition the signal, and one or more other electronic components after the ADC, and one or more other electronic components in general. The weight sensor 106 may include one or more Wheatstone bridges, operational amplifiers, instrumentation amplifiers, low pass filters, analog to digital converters, transistor, LEDs, lasers, microcontrollers, microprocessors, software code, firmware code, accelerometers, gyroscopes, temperature sensors, GPS, encryption/decryption and authentication capabilities, memory, printed circuit board, resistors, capacitors, inductors, power supply, voltage regulators, batteries, wires, connectors, battery chargers, battery level indicators, solar cells, Internet of Things (IoT) technologies, calibration, and more. Again, these may be part of the weight sensor 106, and/or included in the logic 108 separately from the weight sensor 106.

The weight sensor 106 may include wireless technology for transmitting the weight data and other data to one or more mobile devices and/or other computer systems, such as the user device 114. The weight sensor 106 may include wireless technology for receiving data from one or more mobile devices and/or other computer systems and one or more software applications operation on such mobile devices and/or computer systems. Note that other electronic components may be present as understood in the art, such as a battery or capacitor based power supply and a digital memory and a data processor.

The logic 108 (which as noted above may be part of the weight sensor 106) communicates wirelessly with a user device 114 such as a mobile phone, tablet computer, smart appliance, connected speaker like Amazon® Alexa®, game console, laptop computer, etc. The user device 114 executes a user device application 116, and communicates with a server system 120 over a network 118 such as a home WiFi network, cellular network, or the Internet. The server system 120 executes a server application 122 which interfaces (again, usually via the network 118) with an ecommerce system 124 and/or a search engine 126. The system 100 further includes vendor products 128 accessible via the search engine 126 and/or ecommerce system 124, and a fulfillment service 130 for making delivery of products ordered via the ecommerce system 124.

Examples of environment data include but are not limited to ambient temperature, humidity, atmospheric pressure, altitude, acceleration, battery level, velocity, location, and/or more. The logic 108 may further wirelessly receive, store, act on, and wirelessly respond to "configuration and command data" which may include test commands, calibration commands, status requests, technical health status, error messages, acknowledgment responses, and software and firmware installations and updates.

Figure 2:
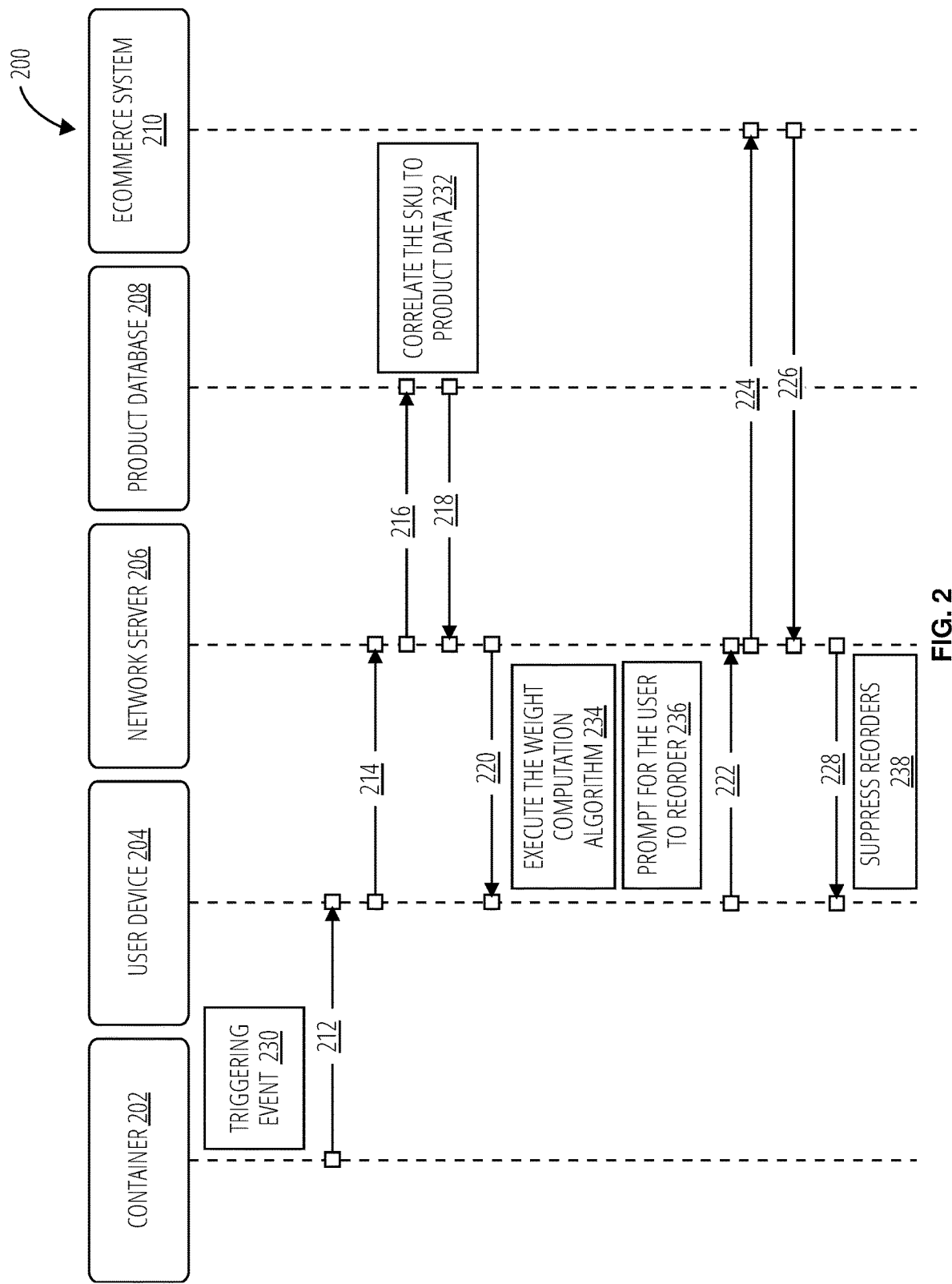
FIG. 2 illustrates one embodiment of a product reorder process 200.
Figure 3:
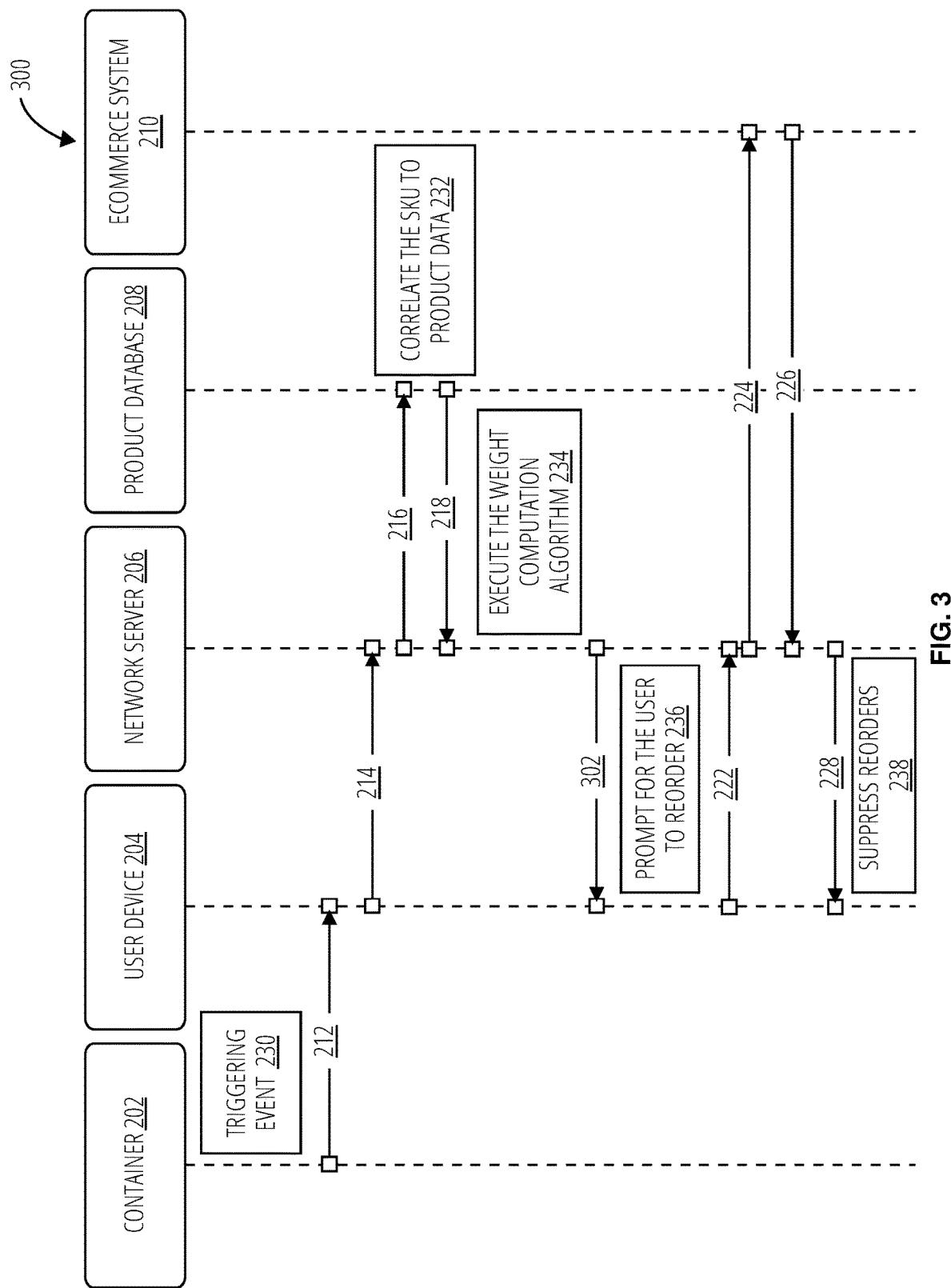
FIG. 3 illustrates another embodiment of a product reorder process 300.

Examples of product data include but are not limited to full weight when originally packaged, product name (e.g. milk), brand, UPC (Universal Product Code), EAN (International Article Number), manufacturer part number, SKU (stock keeping unit), safe food storage temperature ranges, web site addresses, and other product information and identifiers. The examples in FIG. 2 and FIG. 3 illustrate the SKU as the product identifier, but other embodiments could employ one or more other product identifiers, for example from among those indicated above (e.g., UPC, EAN . . . ).

One or more sensors described herein may be attached to the product container 102 by consumers and/or middlemen before, at or after the point of sale to the consumer. The sensor(s) may be built into stickers with adhesive to be stuck to the product packaging. The sensor(s) may be provided to the consumer at, before or after checkout at a store, for example, and attached to the product container 102 at the point of sale, and/or after the point of sale. The sensor(s) may be attached by people, machines and/or robots. Manufactures may attach the sensor(s) to the bottom of the product container 102 on the inside before putting the product 104 into the product container 102. The sensor(s) may be integrated into, embedded within, or attached to separate containers within which product 104 is placed inside or placed on top. One type of container may be a flat surface on which a product 104 rests and another type may be a box with or without a lid that the product 104 can be placed into. The consumer may reuse and may reassign the product container 102 to different products. The stickers may be reusable and may be reassigned.

The illustrated examples show the product data being stored on a network device such as product database 208 (see FIG. 2), and accessed by association with a product ID (e.g., SKU) received from the product container 102. However, some embodiments may store the product data in the logic 108 of the product container 102.

In one scenario, the user device application 116 may assign product data to the product container 102 (or if sold separately from the product container 102, the weight sensor 106 and/or associated logic 108) by first optically scanning the bar code image on the product container 102 with the user device 114 to get the UPC, SKU, or other code value, and second, using the this value to lookup the product data in one or more Internet databases such as the product database 208. In another scenario, the user device application 116 may associate the product data by retrieving from a store check-out cash register bar code scanner system's database. In yet another scenario, the user device application 116 may receive the "product data" directly from the product container 102 in cases where the product data was previously stored in memory of the logic 108. In even yet another scenario, a user may manually enter product data into the product 104 and assign it to each weight sensor 106 and/or product container 102. Alternatives to UPC images and codes may be QR codes and images, and RFIDs, near field communications, and other systems may be used for scanning the product container 102 for looking up product data on the Internet. At least one of receiving the product data from the logic 108, retrieving it from an Internet database such as product database 208, based on an optical product package scan (UPC bar code for example), retrieving it from the store check-out cash register bar code scanner system's database, and manual entry may be used to associate product data for one or more product container 102, product 104, and one or more sensors such as weight sensor 106, or logic 108.

The user device application 116 may be a software development kit (SDK) that 3rd-party applications may integrate. For example, a grocery store may have mobile phone application that provides uses with coupons, loyalty card information, mobile shopping delivery and pick-up services, as feature examples. The grocery store mobile application may incorporate the user device application 116 in the form of an SDK.

The user device application 116 may do more than prompt the user to reorder a product 104 that's reached a low level. The user device application 116 may graphically display the weight level relative to full level. For illustrative purposed, for example, the graphic may look like a gas gauge with a needle positioned between full and empty. The user device application 116 may display a weight in units, such as, for example pounds. The user device 114 may display a percentage full and may alert the user with for example, sounds, notifications, e-mail, and/or colors when the level remaining is at or below a certain threshold level. The user may set the threshold. The user device application 116 may use environment data, for example temperature, received from the product container 102 and compare it to safety data in the product data, for example safe temperatures, to alert on unsafe storage conditions such as, for example, if the product 104 is not properly refrigerated for an unsafe period of time.

In some embodiments, the user doesn't set the reorder threshold and instead the threshold is inferred from the user's profile or behavior. The user device application 116 may collect and send users' product consumption data, and may send environment data, to a software service on the Internet to predict when to reorder one or more products based on user data and/or other data that may include pace of consumption, product lead and delivery times, seasonality, storage temperature patterns, and/or other considerations. The application alert notifications may include recommendations such as when to reorder, alternative products, alternative retailers, recipes, and/or more.

The user device application 116 may allow a user to enter electronic commerce details and authentication information to reorder (such as, for example, on Amazon), payment details, notification and alert settings (e.g. email), and more. The user device application 116 may allow products to be monitored and reordered direct to suppliers' ERP, CRM, and other inventory and procurement technologies. The search engine 126 may provide the user with product offers from one or more digital e-commerce and/or physical retail stores. These offers are search engine results and recommendations may show different digital and/or physical retailers' offers and/or prices for the same products being measured and/or products that are like the ones being measured. The search results may include images, location, web links, prices, options, reviews, and more.

The user device application 116 may communicate over the Internet or other network to the server application 122 that manage the user device application 116, authenticates, and allows for user input and displays information to users. The server system 120 may host and the server application 122 may use one or more third-party software as a service (SaaS) providers one or more database, machine learning algorithms and platforms, security, authentication, payment, financial, and may connect with product search engines, e-commerce systems, payment systems, crypto-currency systems, fulfillment services, user app management and update systems and marketplaces (e.g. Apple), search engines, vendor CRM and ERP systems, and more.

The user device application 116 may be used to scan a bar code, QR code, packaging image, or RFI tag on the product which can be used by the user device application 116 to look up the full capacity, weight, etc. and/or empty capacity, weight, etc. of the product in a database (e.g. product database 208) in the server application 122. The user may be able to manually enter the full amount into the user device application 116. The user may be able to enter a threshold level into the user device application 116 at which to notify them that it's time to repurchase the product 104 or to automatically place the order.

The server application 122 may predict when the product 104 will run out based on consumption pace and may use machine learning algorithms to predict future levels and purchase timing and dates. The user device application 116 notifies the user when it's time to repurchase the product 104 when it reaches the threshold level. The threshold level can be set manually by the user (absolute amount or percent) or the user device application 116 can provide a default level or amount or percent full. The threshold may be determined by the machine learning algorithm such the user is notified to order the product 104 at a time when it predicts will allow for the ecommerce system 124 (e.g. Amazon.com, Walmart-.com, etc.) to process the order and fulfill its delivery or in-store pick-up using the fulfillment service 130.

The user device application 116 may trigger the product order automatically if the user chooses or may require the user's explicit 'purchase' action. The user may set and/or select one or more e-commerce services which may include payment details (e.g. credit card, Pay Pal, Apple Pay, etc.) and/or e-commerce service account credentials and/or the user's home or other physical location details into the user device application 116 for ordering and re-ordering products from the ecommerce system 124. The ecommerce system 124 may fulfill the product order directly by shipping the product to the user or may request that a third party seller (e.g., fulfillment service 130) ship the product to the users or may arrange for the user to pick the product up at a physical store or locker location.

The user device application 116 may present the user with alternatives options from which to purchase the product 104 from vendors offering deals online and/or in physical retail locations. The user device application 116 may communicate with the server application 122 which may include (via an application program interface (API)) one or more product search and/or discovery engines (e.g. Search engine 126—Amazon, Google, etc.) that automatically via one or more search algorithms and web crawlers discover and/or identify offers from one or more vendors. In some cases, one or more vendors may provide (or push) offers via a product data feed or manual entry into the one or more search engines.

Alternatively, the user device application 116 may communicate directly with the search engine 126 and not go through the server application 122. The search engine results are sent to the user app after the weight sensor 106 detects the product 104 is at or nearing or past the threshold level. When the sensor measurement reaches the threshold the user device application 116 may notify the user that it's time to re-order the product 104 and may present one or more search results with offers to purchase the product 104 which allows the user to compare pricing and/or vendor options which may be local and/or online retailers. These may be ecommerce vendors (i.e. services) or physical stores (e.g. Pets Mart) with or without ecommerce. This arrangement connects the search engine 126 with physical sensor measurement at the user (i.e. consumer) level.

Referring now to FIG. 2, a product reorder process 200 proceeds as follows. A container 202 for a product generates a triggering event 230, for example when the product container 102 is lifted and then set down again (implying some of the product 104 was dispensed). The triggering event 230 causes the container 202 to form and communicate a data packet 212 to the user device 204. Examples of the user device 204 are provided in the discussion of FIG. 1. The data packet 212 may include a product SKU, a weight reading (one or more), and environment readings such as temperate and displacement indications (e.g., motion signals from the accelerometer 112). The user device 204 extracts the product SKU 214 and communicates it to the network server 206, for example via a wireless cellular network, or through a home network through a gateway to the Internet (e.g., see network 118).

In the illustrated embodiment of product reorder process 200, the user device 204 executes the algorithm to determine if the weight of the product in the container 202 has dropped below a threshold for reordering. Thus, the network server 206 receives the product SKU 214 and communicates the product SKU 216 in a query to the product database 208, which applies the product SKU 216 to correlate the SKU to product data 232. The network server 206 receives the product data 218 from the product database 208 and communicates the product data 220 to the user device 204. The user device 204 uses the product data 220 and the weight measurement and optionally the environmental data from the data packet 212 to execute the weight computation algorithm 234. If the computed weight is below a threshold value for the product SKU 214 (the threshold may be included in the product data 220), the user device 204 generates a prompt for the user to reorder 236.

If the user selects to reorder, the user device 204 communicates a reorder SKU 222 message to the network server 206. The network server 206 communicates the reorder SKU 224 to the ecommerce system 210, which places the order for the reorder SKU 224, debits the user's account, and generates a receipt 226 which is communicated back to the network server 206, and from there back to the user device 204.

The user device 204 will then suppress reorders for the SKU until a next activation event 238, so that a next triggering event 230 from the container 202 does not trigger a prompt to reorder the same SKU again. An activation event may be generated by a first activation/interaction of the container 202 with the user device 204 (e.g., if the product SKU of the container 202 is globally unique).

Referring to FIG. 3, another embodiment of a product reorder process 300 is similar to the product reorder process 200, except that the network server 206 is implemented to execute the weight computation system 234. If the computed weight is below a reorder threshold, the network server 206 communicates a reorder signal 302 to the user device 204, and the user device 204 prompts the user in the same manner. The product reorder process 200 or product reorder process 300 may use temperature readings from the environment data for temperature compensation to calibrate the calculated weight associated with digital weight data values since the weight sensor components resistance levels may be affected by temperature, in order to have an accurate measurement. Other techniques may be used to compensate weight sensor components resistance changes in response to temperature including using a dedicated weight sensor components as temperature reference as understood by those skilled in the art. In other implementations, temperature compensation may be implemented in the logic 108.

The system may use temperature data from the environment data to alert a user via the user device application 116 that the product not stored a safe temperature by comparing the temperature data with safe temperature information which may be from the product data. The system may notify the user via the user device application 116 that the state of the product is 'not safe temperature' or is 'safe temperature'.

Figure 4:
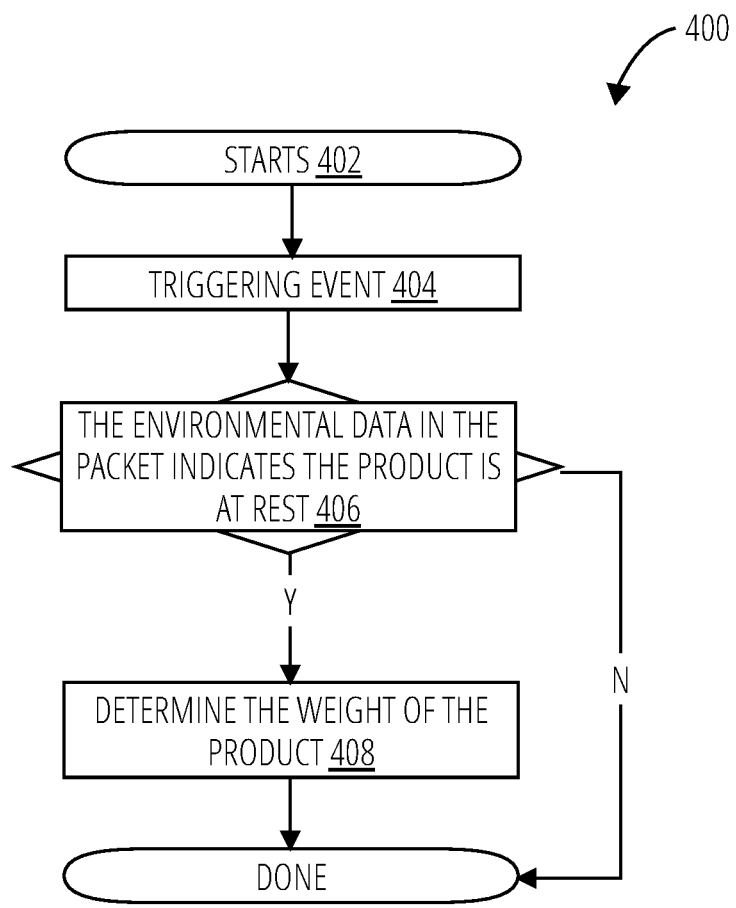
FIG. 4 illustrates a weight determination process 400 in accordance with one embodiment.

The state of the product may not be conducive to accurate weight readings. The system may take measures to ensure that the product is in a restful state before attempting to determine the weight. Referring to FIG. 4, a weight determination process 400 starts 402 and there's a triggering event 404 that results in an environmental data packet from the product container. If the environmental data in the packet indicates the product is at rest 406, the system will determine the weight of the product 408, otherwise the weight is not determined until a triggering event is received indicating the product has entered a restful state (e.g., the container of the product was set down after being used).

The system may use accelerometer data from the environment data to detect that a product is not at rest on a surface, and in a 'not at rest' state and to not perform calculations and/or to instruct the software application to not update the weight status reported to the consumer, as it may not be able to make an accurate measurement. The system may notify the consumer via the user device application 116 that the state of the product is 'not at rest'. The system may use accelerometer data from the environment data to detect that a container is not at rest on a surface, and in a 'not at rest' state and to not perform calculations and/or to instruct the system to not update the weight status reported to the user, as it may not be able to make an accurate measurement. The system may notify the user via the user device application 116 that the state of the container is 'not at rest'.

The system may use gyro data from the environment data to detect that a product is not at rest on a surface, and in a 'not at rest' state and to not perform calculations and/or to instruct the system to not update the weight status reported to the user, as it may not be able to make an accurate measurement. The system may notify the consumer via the user device application 116 that the state of the product is 'not at rest'. The system may use gyro data from the environment data to detect that a container is not at rest on a surface, and in a 'not at rest' state and to not perform calculations and/or to instruct the system to not update the weight status reported to the user, as it may not be able to make an accurate measurement. The system may notify the consumer via the user device application 116 that the state of the container is 'not at rest'.

The system may use proximity data from the environment data to detect that a product is not in a container, and in a 'out-of-container' state, and to not perform calculations and/or to instruct the system of such state. For example, if a container has a piezo resistive strain gauge as its weight sensor component embedded in its bottom, which when combined with a logic 108, is used to sense a carton of milk's weight with the milk carton is at rest in the container, the proximity data may be used by the system to detect cases in which the carton of milk is removed from the container and via the application notify a user of the 'out-of-container' state. The container may have at least one of piezo resistive strain gauges, optical, and proximity sensors to sense the 'out of container' state when the signal from one or more of these sensors is processed by logic 108 and included in the environment data as proximity data transmitted to the system.

The system may use proximity data from the environment data to detect that a product is not at rest on a surface, and in a 'not at rest' state, and to not perform calculations and/or to instruct the software application to not update the weight status reported to the user, as it may not be able to make an accurate weight measurement. For example, if a product package has a piezo resistive strain gauge as its weight sensor component embedded in its bottom, which when combined with a logic 108, is used to sense a carton of milk's weight with the milk carton is at rest on a surface, the proximity data may be used by the system to detect cases in which the carton of milk is removed from the surface and via the application notify a user of the 'not at rest' state. The product packaging may have at least one of piezo resistive strain gauges, optical, and proximity sensors to sense the 'not at rest' state when the signal from one or more of these sensors is processed by logic 108 and included in the environment data as proximity data transmitted to the system. The system may use proximity data from the environment data to detect that a product is in a container but the container is not at rest on a surface, and in a 'not at rest' state, and to not perform calculations and/or to instruct the system to not update the weight status reported to the user, as it may not be able to make an accurate weight measurement. For example, if a product package has a piezo resistive strain gauge as its weight sensor component embedded in its bottom, which when combined with logic 108, is used to sense a carton of milk's weight with the milk carton in a container and the container is at rest on a surface, the proximity data may be used by the system to detect cases in which the container with the carton of milk is removed from the surface and via the application notify a user of the 'not at rest' state.

The product packaging may have at least one of piezo resistive strain gauges, optical, and proximity sensors to sense the 'not at rest' state when the signal from one or more of these sensors is processed by the logic 108 and included in the environment data as proximity data transmitted to the system.

Figure 5:
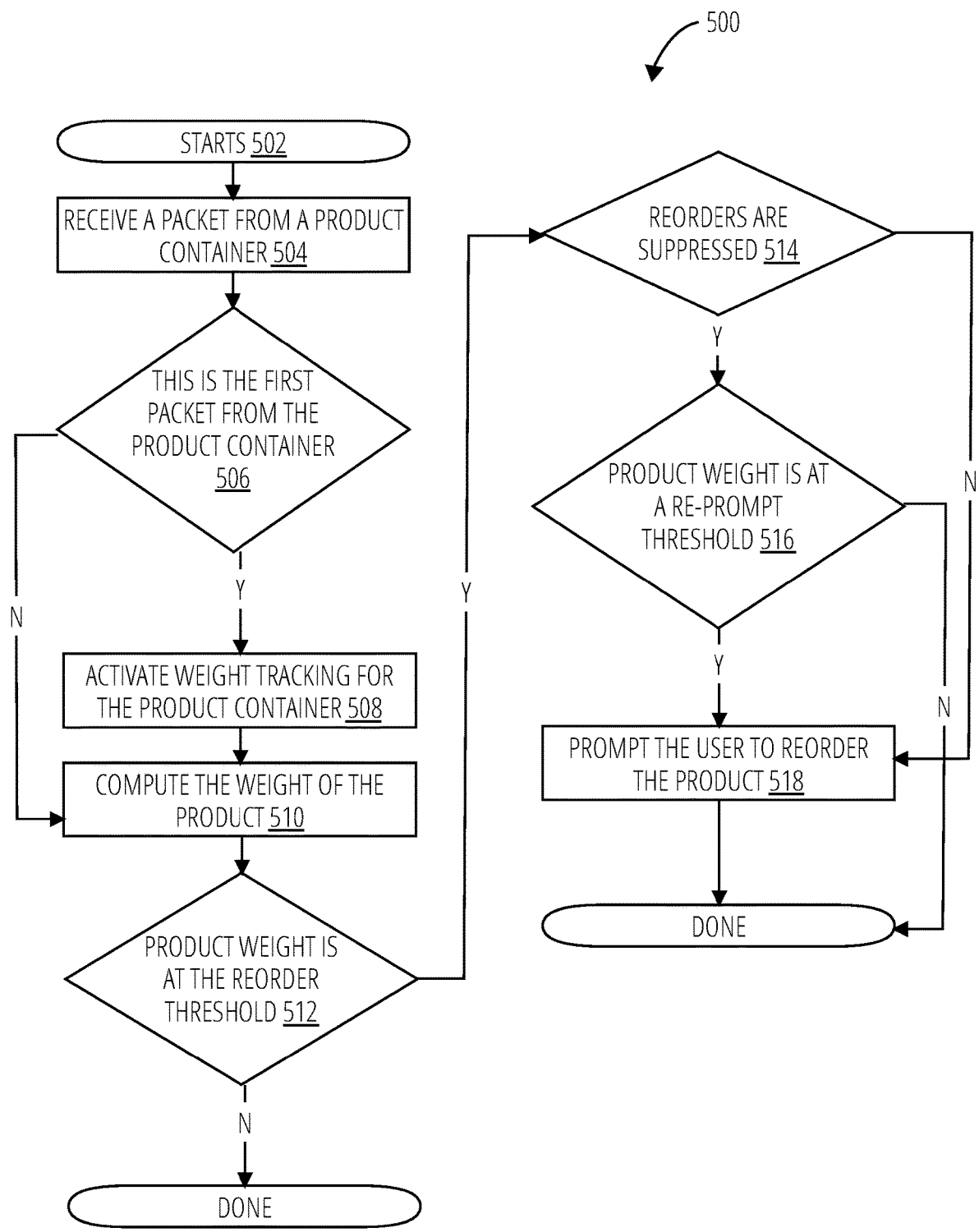
FIG. 5 illustrates a product reordering process 500 in accordance with one embodiment.

The system may intelligently determine when to prompt the user to reorder the product. Referring now to FIG. 5, a product reordering process 500 comprises starts 502 when there is a triggering event (e.g., see FIG. 2) causing the system to receive a packet from a product container 504. If this is the first packet from the product container 506, the system will activate weight tracking for the product container 508. The system now has the product container in its records for weight tracking and reordering purposes.

The system will now compute the weight of the product 510, as previously described for example, and determine if a product weight is at the reorder threshold 512. If the reorder threshold has been reached, but reorders are suppressed 514, the system checks if the product weight is at a re-prompt threshold 516. If prompting the user to reorder is suppressed, either because the user already reordered, or because the user suppressed prompts until a next lower reorder threshold is reached, then the product reordering process 500 concludes without prompting the user to reorder. Otherwise, the product reordering process 500 will prompt the user to reorder the product 518, at which point the user will either reorder, or select to suppress reordering the product at all, or suppress prompts until a next lower weight threshold is determined.

In a preferred mode of operation, the logic 108 of the container 102 reads an output of the motion sensor (e.g., accelerometer and/or gyro) to determine when the container 102 is in motion. Upon detecting that the container 102 is no longer in motion after being in motion, the logic 108 reads the weight sensor 106 for a weight reading and triggers communication of a data packet using wireless communication logic. The data packet in this preferred mode is formed by the logic 108 to include at least the weight reading and a product identifier.

The user device application 116 receives the data packet and selectively displays an operable control on the user device 114, on condition that a weight of the product 104 as determined from the weight reading is below a threshold level, and further, that the display of the operable control is not suppressed by a prior user response to a prior weight reading for the product. The user device application 116 may apply a temperature reading from the data packet to determine whether to selectively display the operable control (e.g., if the product 104 is nearing an end of fresh life), or has been exposed to unsafe temperatures. In some cases, the temperate reading may override any suppression or threshold settings in place for the product weight, for selective display of the operable control.

Examples of events that can suppress display of the operable control include a prior user response to reorder of the product, to reorder a different product that is analogous, or the user setting a next lower threshold level for the weight reading to trigger display of the operable control.

As noted previously, the threshold level may be set automatically by the system, as a level determined from analyzing a change rate of the weight of the product (user consumption habit).

Figure 6:
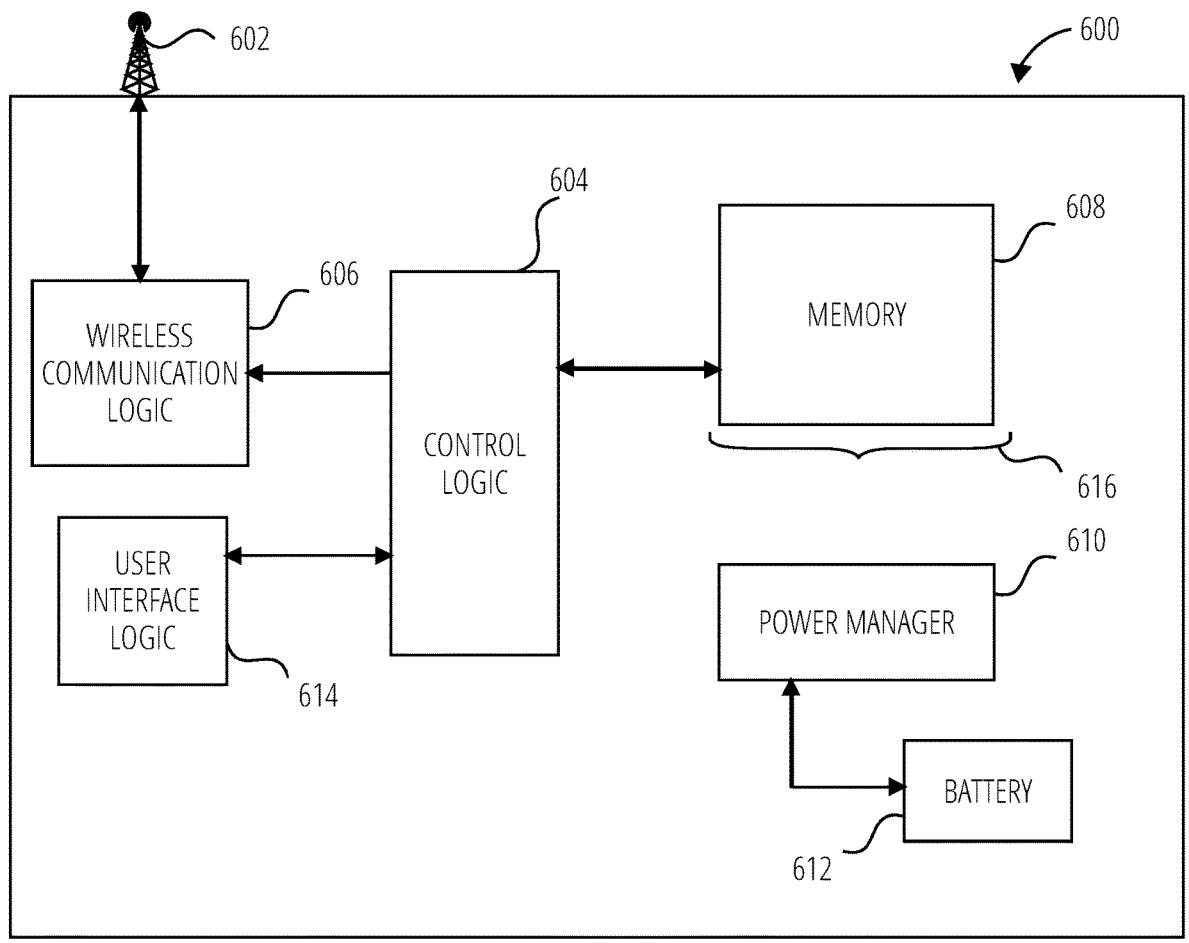
FIG. 6 illustrates an embodiment of a mobile device 600.

Referring to FIG. 6, a mobile device 600 that may be utilized as the user device 114 executing the user device application 116 comprises an antenna 602, control logic 604, wireless communication logic 606, a memory 608, a power manager 610, a battery 612, logic 616, and user interface logic 614.

The control logic 604 controls and coordinates the operation of other components as well as providing signal processing for the mobile device 600. For example control logic 604 may extract baseband signals from radio frequency signals received from the wireless communication logic 606 logic, and processes baseband signals up to radio frequency signals for communications transmitted to the wireless communication logic 606 logic. Control logic 604 may comprise a central processing unit, digital signal processor, and/or one or more controllers or combinations of these components.

The wireless communication logic 606 may further comprise memory 608 which may be utilized by the control logic 604 to read and write instructions (commands) and data (operands for the instructions). The memory 608 may comprise logic 616 to carry out aspects of the processes disclosed herein, e.g., those aspects executed by a smart phone or other mobile device.

A human user or operator of the mobile device 600 may utilize the user interface logic 614 to receive information from and input information to the mobile device 600. Images, video and other display information, for example, user interface optical patterns, may be output to the user interface logic 614, which may for example operate as a liquid crystal display or may utilize other optical output technology. The user interface logic 614 may also operate as a user input device, being touch sensitive where contact or close contact by a use's finger or other device handled by the user may be detected by transducers. An area of contact or proximity to the user interface logic 614 may also be detected by transducers and this information may be supplied to the control logic 604 to affect the internal operation of the mobile device 600 and to influence control and operation of its various components.

Audio signals may be provided to user interface logic 614 from which signals output to one and more speakers to create pressure waves in the external environment representing the audio. The mobile device 600 may convert audio phenomenon from the environment into internal electro or optical signals by operating a microphone and audio circuit (not illustrated).

The mobile device 600 may operate on power received from a battery 612. The battery 612 capability and energy supply may be managed by a power manager 610.

The mobile device 600 may transmit wireless signals of various types and range (e.g., cellular, GPS, WiFi, BluTooth, and near field communication i.e. NFC). The mobile device 600 may also receive these types of wireless signals. Wireless signals are transmitted and received using wireless communication logic 606 logic coupled to one or more antenna 602. Other forms of electromagnetic radiation may be used to interact with proximate devices, such as infrared (not illustrated).

Figure 7:
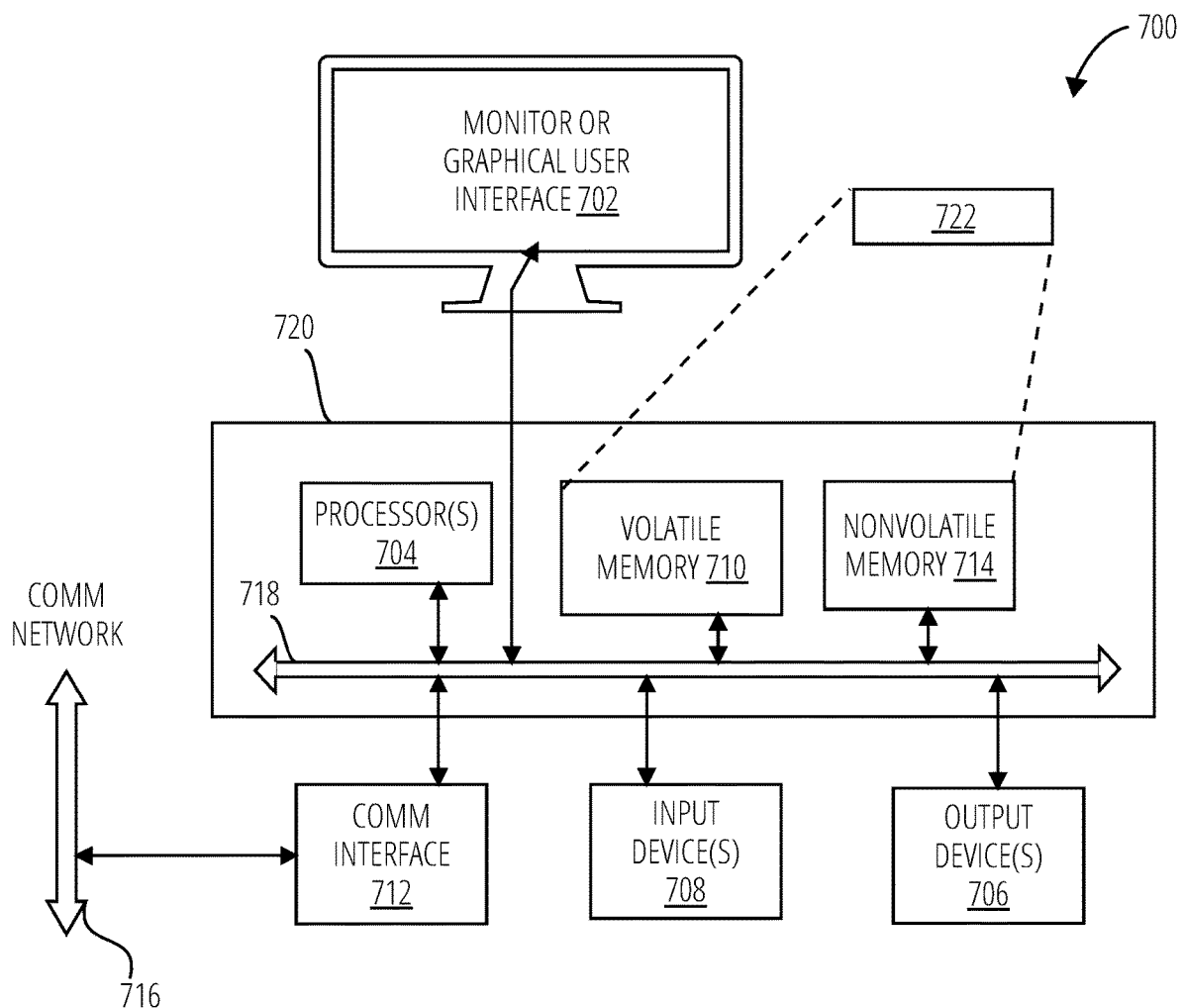
FIG. 7 is an example block diagram of a computing device 700 that may incorporate embodiments of the present invention.

FIG. 7 is an example of a computing device 700 that may incorporate embodiments of the present invention, such as the server application 122 or in some cases the user device application 116 when the user doesn't have a mobile device. FIG. 7 is merely illustrative of a machine system to carry out aspects of the technical processes described herein, and does not limit the scope of the claims. One of ordinary skill in the art would recognize other variations, modifications, and alternatives. In one embodiment, the computing device 700 typically includes a monitor or graphical user interface 702, a data processing system 720, a communication network interface 712, input device(s) 708, output device(s) 706, and the like.

As depicted in FIG. 7, the data processing system 720 may include one or more processor(s) 704 that communicate with a number of peripheral devices via a bus subsystem 718. These peripheral devices may include input device(s) 708, output device(s) 706, communication network interface 712, and a storage subsystem, such as a volatile memory 710 and a nonvolatile memory 714.

The volatile memory 710 and/or the nonvolatile memory 714 may store computer-executable instructions and thus forming logic 722 that when applied to and executed by the processor(s) 704 implement embodiments of the processes disclosed herein.

The input device(s) 708 include devices and mechanisms for inputting information to the data processing system 720. These may include a keyboard, a keypad, a touch screen incorporated into the monitor or graphical user interface 702, audio input devices such as voice recognition systems, microphones, and other types of input devices. In various embodiments, the input device(s) 708 may be embodied as a computer mouse, a trackball, a track pad, a joystick, wireless remote, drawing tablet, voice command system, eye tracking system, and the like. The input device(s) 708 typically allow a user to select objects, icons, control areas, text and the like that appear on the monitor or graphical user interface 702 via a command such as a click of a button or the like.

The output device(s) 706 include devices and mechanisms for outputting information from the data processing system 720. These may include the monitor or graphical user interface 702, speakers, printers, infrared LEDs, and so on as well understood in the art.

The communication network interface 712 provides an interface to communication networks (e.g., communication network 716) and devices external to the data processing system 720. The communication network interface 712 may serve as an interface for receiving data from and transmitting data to other systems. Embodiments of the communication network interface 712 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 712 may be coupled to the communication network 716 via an antenna, a cable, or the like. In some embodiments, the communication network interface 712 may be physically integrated on a circuit board of the data processing system 720, or in some cases may be implemented in software or firmware, such as "soft modems", or the like.

The computing device 700 may include logic that enables communications over a network using protocols such as HTTP, TCP/IP, RTP/RTSP, IPX, UDP and the like.

The volatile memory 710 and the nonvolatile memory 714 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 710 and the nonvolatile memory 714 may be configured to store the basic programming and data constructs that provide the functionality of the disclosed processes and other embodiments thereof that fall within the scope of the present invention.

Logic 722 that implements embodiments of the present invention may be stored in the volatile memory 710 and/or the nonvolatile memory 714. Said logic 722 may be read from the volatile memory 710 and/or nonvolatile memory 714 and executed by the processor(s) 704. The volatile memory 710 and the nonvolatile memory 714 may also provide a repository for storing data used by the logic 722.

The volatile memory 710 and the nonvolatile memory 714 may include a number of memories including a main random access memory (RAM) for storage of instructions and data during program execution and a read only memory (ROM) in which read-only non-transitory instructions are stored. The volatile memory 710 and the nonvolatile memory 714 may include a file storage subsystem providing persistent (non-volatile) storage for program and data files. The volatile memory 710 and the nonvolatile memory 714 may include removable storage systems, such as removable flash memory.

The bus subsystem 718 provides a mechanism for enabling the various components and subsystems of data processing system 720 communicate with each other as intended. Although the communication network interface 712 is depicted schematically as a single bus, some embodiments of the bus subsystem 718 may utilize multiple distinct busses.

It will be readily apparent to one of ordinary skill in the art that the computing device 700 may be a device such as a smartphone, a desktop computer, a laptop computer, a rack-mounted computer system, a computer server, or a tablet computer device. As commonly known in the art, the computing device 700 may be implemented as a collection of multiple networked computing devices. Further, the computing device 700 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A system comprising:
    a container enclosing a product;
    a sensor arrangement attached to the container, the sensor arrangement comprising at least a weight sensor and a motion sensor;
    the container comprising wireless communication logic;
    the container further comprising logic to:
        read an output of the motion sensor to determine when the container is in motion; and
        triggering, upon detecting that the container is no longer in motion after being in motion, reading of the weight sensor for a weight reading and communication of a data packet using the wireless communication logic, the data packet comprising at least the weight reading and a product identifier;
    application logic to receive the data packet on a user device; and
    the application logic comprising logic to selectively display an operable control on the user device on condition that a weight of the product as determined from the weight reading is below a threshold level and that the display of the operable control is not suppressed by a prior user response to a prior weight reading for the product.

2. The system of claim 1, further comprising:
    the application logic comprising logic to interact with server logic to obtain descriptive information about the product.

3. The system of claim 1, wherein the sensor arrangement further comprises:
    a temperature sensor.

4. The system of claim 3:
    the data packet further comprising a temperature reading from the temperature sensor; and
    the application logic further comprising logic to apply the temperature reading to determine whether to selectively display the operable control.

5. The system of claim 1, wherein the prior user response comprises a reorder of the product.

6. The system of claim 1, wherein the prior user response comprises a reorder of a different product.

7. The system of claim 1, wherein the prior user response comprises setting a next lower threshold level for the weight reading.

8. The system of claim 1, wherein the threshold level comprises a level determined from analyzing a change rate of the weight of the product.

* * * * *